United States Patent [19]
Murphy

[11] Patent Number: 5,345,857
[45] Date of Patent: Sep. 13, 1994

[54] THERMOPLASTIC BELLOWS AND METHOD OF FORMING THE SAME

[75] Inventor: Patrick H. Murphy, Upland, Calif.

[73] Assignee: Osmonics, Inc., Minnetonka, Minn.

[21] Appl. No.: 12,531

[22] Filed: Feb. 2, 1993

[51] Int. Cl.5 .................. F01B 19/00; F16K 31/00; B23P 19/04

[52] U.S. Cl. .................. 92/34; 251/335.3; 251/335.2; 251/129.17; 137/625.5; 277/212 C; 29/421.1; 29/454; 264/154; 264/318; 264/572

[58] Field of Search .......... 92/34, 90, 91, 93, 84; 251/335.3, 335.2, 129.17; 137/625.5, 625.27; 277/212 R, 212 C, 212 F, 212 FB; 29/454, 421.1; 264/572, 318, 154

[56] References Cited

U.S. PATENT DOCUMENTS

| | | | |
|---|---|---|---|
| Re. 34,261 | 5/1993 | Sule | 251/335.2 X |
| 2,240,163 | 4/1941 | Pick | 251/335.3 X |
| 2,563,138 | 8/1951 | Smith | 251/335.2 X |
| 2,636,685 | 4/1953 | Clark | 251/335.2 X |
| 2,843,151 | 7/1958 | Greenwalt | 92/84 |
| 2,962,974 | 12/1960 | Porkert | 92/84 X |
| 3,703,342 | 11/1972 | O'Connor | 92/93 X |
| 3,780,693 | 12/1973 | Parr | 92/34 X |
| 4,208,060 | 6/1980 | St. Laurent, Jr. | 277/212 FB |
| 4,244,589 | 1/1981 | St. Laurent, Jr. | 277/212 FB X |
| 4,407,517 | 10/1983 | Neyer | 277/212 FB |
| 4,421,295 | 12/1983 | Parkison | 251/335.3 X |
| 4,833,973 | 5/1989 | Wang | 92/36 X |
| 5,000,215 | 3/1991 | Phillips | 251/335.3 X |

FOREIGN PATENT DOCUMENTS

2010596 2/1970 Fed. Rep. of Germany ...... 251/335

Primary Examiner—Edward K. Look
Assistant Examiner—John Ryznic
Attorney, Agent, or Firm—Kinney & Lange

[57] ABSTRACT

A bellows for use in fluid control devices includes a head, a shoulder, a blind hole extending from an opening in the shoulder to the head, and a hollow compressible neck between the head and the shoulder, through which the blind hole extends. The neck includes a thin-walled, circumferential band located between the shoulder and the head. The bellows is formed by forming, in a body of thermoplastic material, an inner bore having an inner diameter. Next, at least one thin-walled circumferential band is formed between the head and the shoulder. Finally, the body is deformed to cause each circumferential band to bow.

19 Claims, 5 Drawing Sheets

THERMOPLASTIC BELLOWS AND METHOD OF FORMING THE SAME

BACKGROUND OF THE INVENTION

The invention relates to devices used in the control and handling of liquid chemicals including acids, solvents, bases, photo-resists, dopants, inorganics, organics, biological solutions, pharmaceuticals, radioactive chemicals, and liquids commonly used in the semiconductor industry. In particular, the invention relates to fluid control devices which employ a bellows in handling the liquid chemicals.

Bellows have had numerous applications in the area of fluid control. Bellows have been used by devices which pump liquids, which regulate the flow of liquids, and which measure differential pressures. In certain industries, particularly the semiconductor industry, it is essential that the liquid chemical avoid contamination. Contact with metallic componentry may cause ionic contamination. In addition, removal of submicron particulate within the devices is extremely difficult. These particulates end up in the liquid chemicals and affect their purity. To prevent contamination of the liquid chemicals, inert thermoplastic materials, such as polytetrafluoroethylene (PTFE) are used in the construction of liquid chemical handling devices.

Forming bellows from thermoplastic materials is a tedious, expensive, and time-consuming process. Currently, bellows are formed from PTFE by machining or molding both an inside and outside surface of the PTFE to form convolutes on both the inside and outside surface of the PTFE. The convolutes, which give the PTFE bellows its compressibility, alternate between the inside and outside surfaces. Because bellows used in such liquid handling devices are very small, each convolute typically being 2/10 of an inch wide, machining both sides of the PTFE to form a bellows is difficult.

SUMMARY OF THE INVENTION

The present invention is an improved bellows. The bellows includes a head, a shoulder, a blind hole extending from an opening in the shoulder to the head, and a compressible neck between the head and the shoulder. The neck is formed of at least one circumferential band, each circumferential band being capable of bowing outwardly as axial distance between the head and the shoulder is reduced to shorten the neck.

The bellows is formed in less time and at a lower cost than the prior methods of forming bellows. First, an inner bore having an inner diameter is formed within a body of thermoplastic material, such as PTFE. Second, at least one thin-walled circumferential band is formed between the head and the shoulder. Finally, the body of thermoplastic material is deformed to cause each band to bow outwardly. When more than one band is formed, circumferential ribs are also formed between each pair of bands. To reduce strain and stress in each band during deformation of each band, undercuts preferably are formed where the bands and the ribs meet. Undercuts are also formed where the bands meet the head and the shoulder. Two methods may be used to deform the body to cause each band to bow outwardly. Fluid pressure may be applied in the inner bore to cause outward bowing of each circumferential band. Alternatively, an axial compressive force may be applied to the body to cause outward bowing of each circumferential band.

DETAILED DESCRIPTION OF THE PREFERRED EMBODIMENTS

Figure 1:
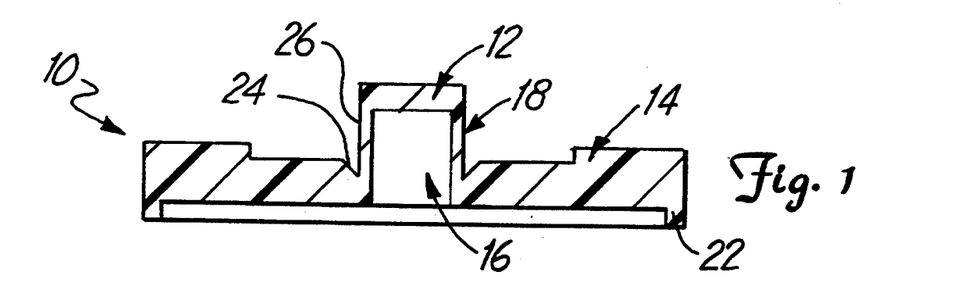
FIG. 1 is a sectional view of a single convolute bellows before deformation.
Figure 2:
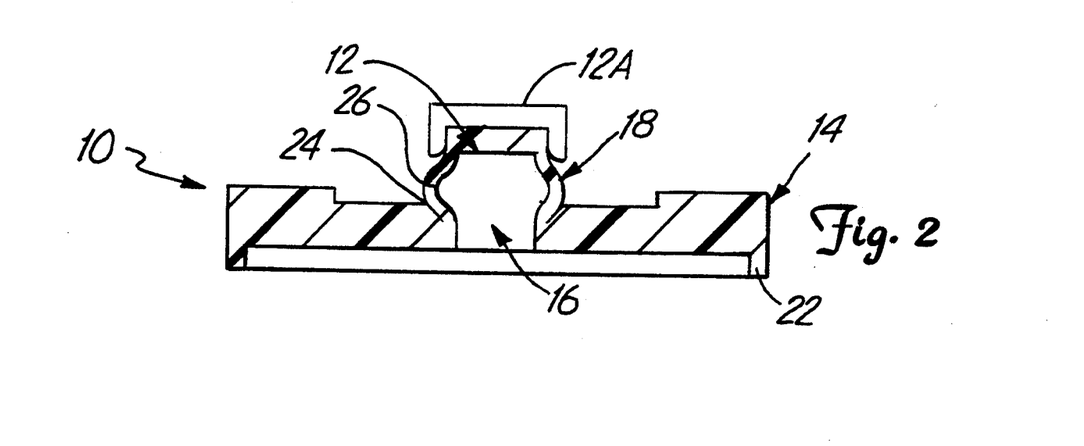
FIG. 2 is a sectional view of the bellows of FIG. 1 after deformation.

FIGS. 1 and 2 show a single convolute bellows 10. FIG. 1 shows the bellows 10 before deformation. FIG. 2 shows the bellows 10 after deformation. Bellows 10 includes head 12, shoulder 14, blind hole 16, and neck 18. Head 12 and shoulder 14 are integrally connected by neck 18. Blind hole 16 extends from an opening 20 in shoulder 14 to head 12. Shoulder 14 includes tongue 22 and undercut 24. Tongue 22 is integral with shoulder 14 and emanates downward from shoulder 14 away from head 12 around an outer perimeter of shoulder 14. Undercuts 24 extend into a top side of shoulder 14 where shoulder 14 meets neck 18. Neck 18 consists of a thin-walled circumferential band or convolute 26, which integrally connects head 12 and shoulder 14. As best shown in FIG. 2, circumferential band 26 bows outward after bellows 10 is deformed.

Bellows 10 is formed by the following method. Blind hole 16 is first formed in a body of thermoplastic material, such as PTFE. Next, thin-walled circumferential band or convolute 26 is formed between shoulder 14 and head 12. To reduce strain and stress in band 26 during deformation of band 26, undercut 24 is formed where band 26 and shoulder 14 meet. Finally, the body of thermoplastic material is deformed to cause band 26 to bow outwardly. Two methods may be used to deform the body to cause band 26 to bow outwardly. First, fluid pressure may be applied in blind hole 16 to cause outward bowing of band 26. Second, an axial compressant force may be applied to the body to cause outward bowing of band 26. In addition, deformation of band 26 may also be achieved by combining both methods, applying fluid pressure in hole 16 while an axial compressant force is applied to the body of bellows 10. During deformation, cap 12A may be placed over head 12 to prevent outward bowing or deformation of head 12. Finally, tongue 22 is formed on a lower outer perimeter of shoulder 14. Although tongue 22, undercut 24, convolute 26 and hole 16 are typically formed from a machining or boring process, other processes, such as molding, could also be used to form bellows 10.

In use, bellows 10 permits axial motion of head 12 with respect to shoulder 14, while at the same time it provides a fluid barrier which isolates fluid from a source of axial force. Because circumferential band 26 is capable of changing its outward bow to allow neck 18 to change lengths in an axial direction, head 12 of bellows 10 is movable in an axial direction with respect to shoulder 14. As axial force is applied to head 12 to cause head 12 to move in an axial direction with respect to shoulder 14, compressible neck 18 changes length. Thus, bellows 10 permits axial motion.

In addition, bellows 10 also seals off or isolates a fluid or a liquid chemical from the source of axial force. Tongue 22 of shoulder 14 permits a seal to be formed between bellows 10 and a fluid control device in which bellows 10 is employed. Thus, fluid is isolated below shoulder 14 while an axial force can be applied to head 12, which transfers the force to a component of a fluid control device captured within blind hole 16.

Figure 3:
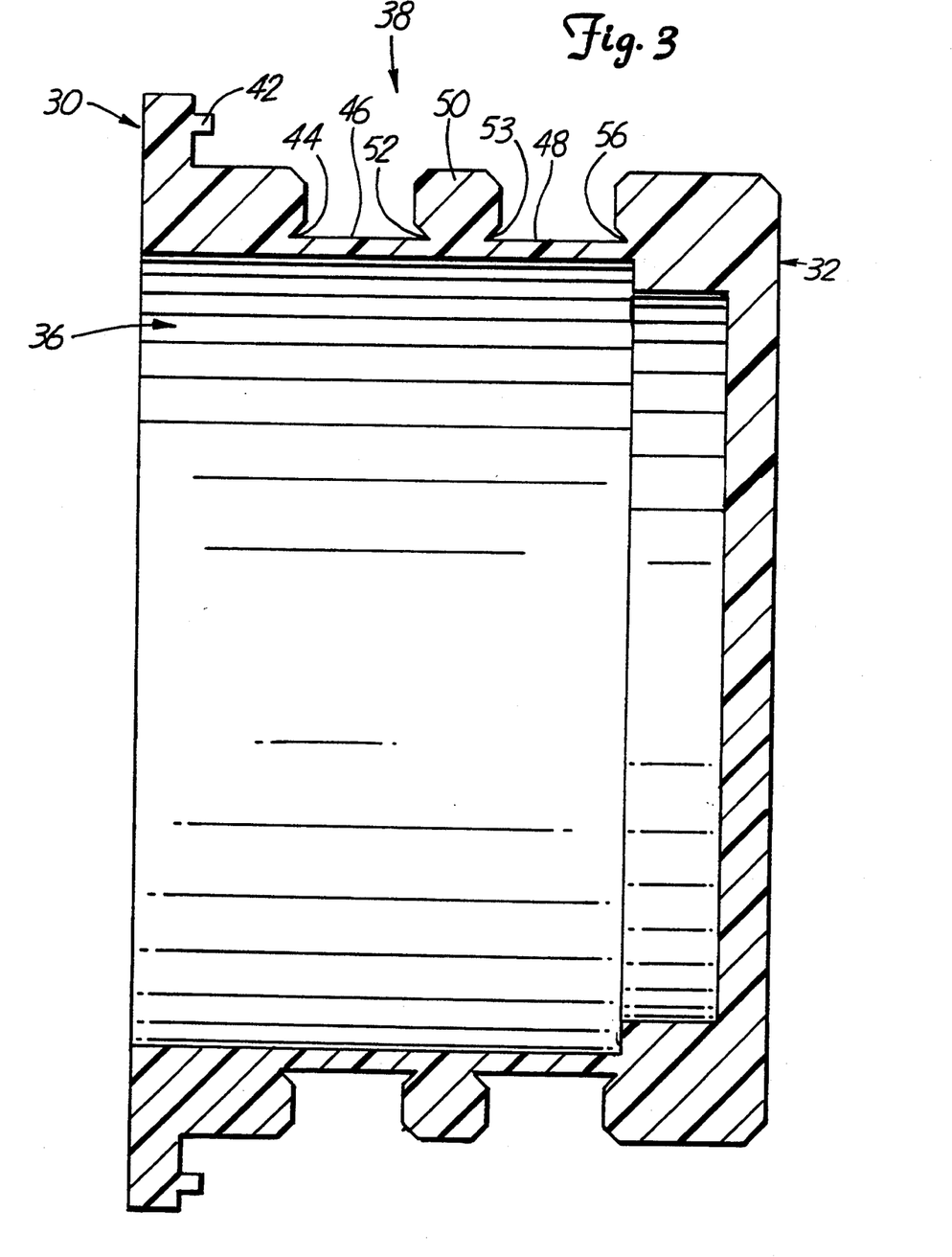
FIG. 3 is a sectional view of a multiple convolute bellows before deformation.
Figure 4:
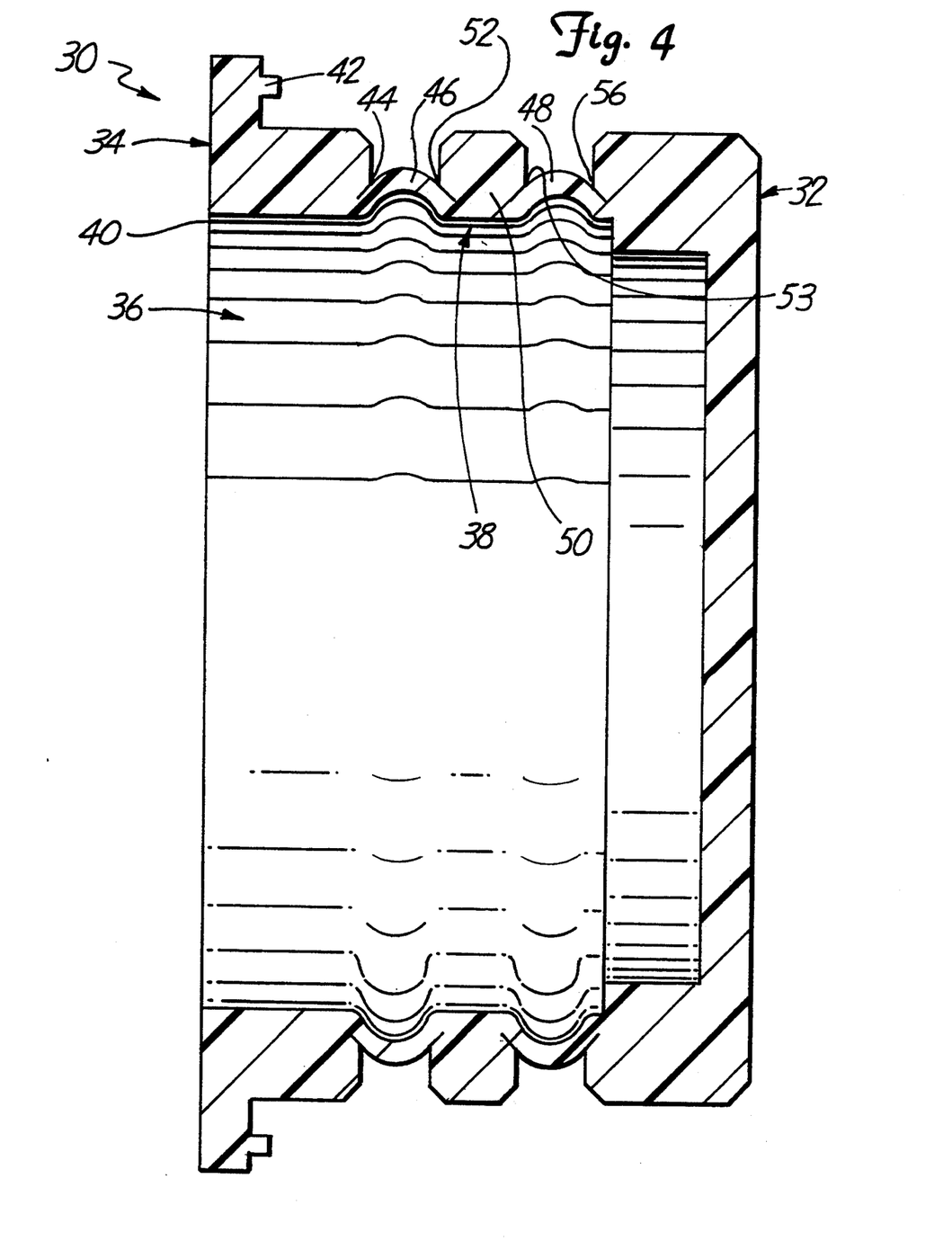
FIG. 4 is a sectional view of the bellows of FIG. 3 after deformation.

FIGS. 3 and 4 show a preferred embodiment of multiple convolute bellows 30. FIG. 3 shows the multiple convolute bellows 30 before deformation, while FIG. 4 shows multiple convolute bellows 30 after deformation. Multiple convolute bellows 30 provides increased motion capability. Bellows 30 includes head 32, shoulder 34, blind hole 36, and neck 38. Neck 38 integrally connects head 32 and shoulder 34. Blind hole 36 extends from an opening 40 in shoulder 34 to head 32.

Shoulder 34 includes tongue 42 and undercut 44. Tongue 42 is integral with shoulder 34 and emanates toward head 32 near an outer perimeter of shoulder 34. Undercut 44 extends into shoulder 34 where shoulder 34 and neck 38 meet.

Neck 38 includes thin-walled circumferential bands 46 and 48, circumferential rib 50, and undercuts 52 and 53. Band 46 integrally extends from below undercut 44 of shoulder 34 to below undercut 52 where band 46 integrally connects with circumferential rib 50. Band 48 integrally extends from rib 50 below undercut 53 to head 32. Head 32 is integrally connected with band 48 and includes undercut 56 which extends away from shoulder 34 into head 32 above band 48. As best shown in FIG. 4, bands 46 and 48 bow outwardly upon deformation of bellows 30. Thus, as axial force is applied to head 32 to cause head 32 to move in an axial direction with respect to shoulder 34, bands or convolutes 46 and 48 bow further outwardly to permit neck 38 to change length in the axial direction. Because bands 46 and 48 both bow outwardly, the outward bowing of bands 46 and 48 during compression of the bellows 30 does not cause bands 46 and 48 to project into blind hole 36. Rib 50 provides structural strength to bellows 30 and prevents inward collapsing of bellows 30. Undercuts 44 and 56 relieve stress and strain between bands 46 and 48 and shoulder 34 and head 32, respectively. Undercuts 52 and 53 relieve stress and strain between bands 46 and 48 and circumferential rib 50.

Bellows 30 is formed by the following method. Initially, the blind hole 36 is formed in a body of thermoplastic material, such as PTFE. Next, thin-walled circumferential bands 46 and 48 having circumferential rib 50 between bands 46 and 48 are formed. Typically, bands 46 and 48 are formed by a machining process. However, other processes, such as molding, may also be used to form bands 46 and 48. Because bands 46 and 48 are parallel to one another and are formed in one circumferential surface, forming bands 46 and 48 and rib 50 is much easier. If machining is used to form bands 46 and 48, only an outer surface of the body of thermoplastic material need be machined to form bands 46 and 48. Molding is also made easier because only the outer surface of the body of thermoplastic material is molded to form bands 46 and 48 and rib 50. Thus, bellows 30 is formed in less time and at a lower cost than prior methods of forming bellows.

Alternatively, bands 46 and 48 having rib 50 may be formed before blind hole 36 is formed. To increase motion capability of bellows 30, additional bands and ribs may also be formed between head 32 and shoulder 34. To reduce strain and stress in each band 46 and 48 during deformation of each band 46 and 48, undercuts 52 and 53 are formed in bellows 30 before deformation of the body where bands 46 and 48 and rib 50 meet. To provide a fluid seal between bellows 30 and a fluid control device in which bellows 30 is applied, tongue 42 is formed around an outer perimeter of shoulder 34.

Finally, the body of thermoplastic material is deformed to cause each band to bow outwardly. Two methods may be used to deform the body to cause each band 46 and 48 to bow outwardly. Fluid pressure may be applied in the inner bore or blind hole 36 to cause outward bowing of each circumferential band 46 and 48. Typically, depending upon the thickness of each convolute to be deformed, low pressure is sufficient to deform the convolutes. Alternatively, an axial compressant force may be applied to the body to cause outward bowing of each circumferential band 46 and 48. Deformation of bands 46 and 48 may also be achieved by combining both methods: applying fluid pressure in inner bore 36 while an axial compressant force is applied to the body of bellows 30.

Figure 5:
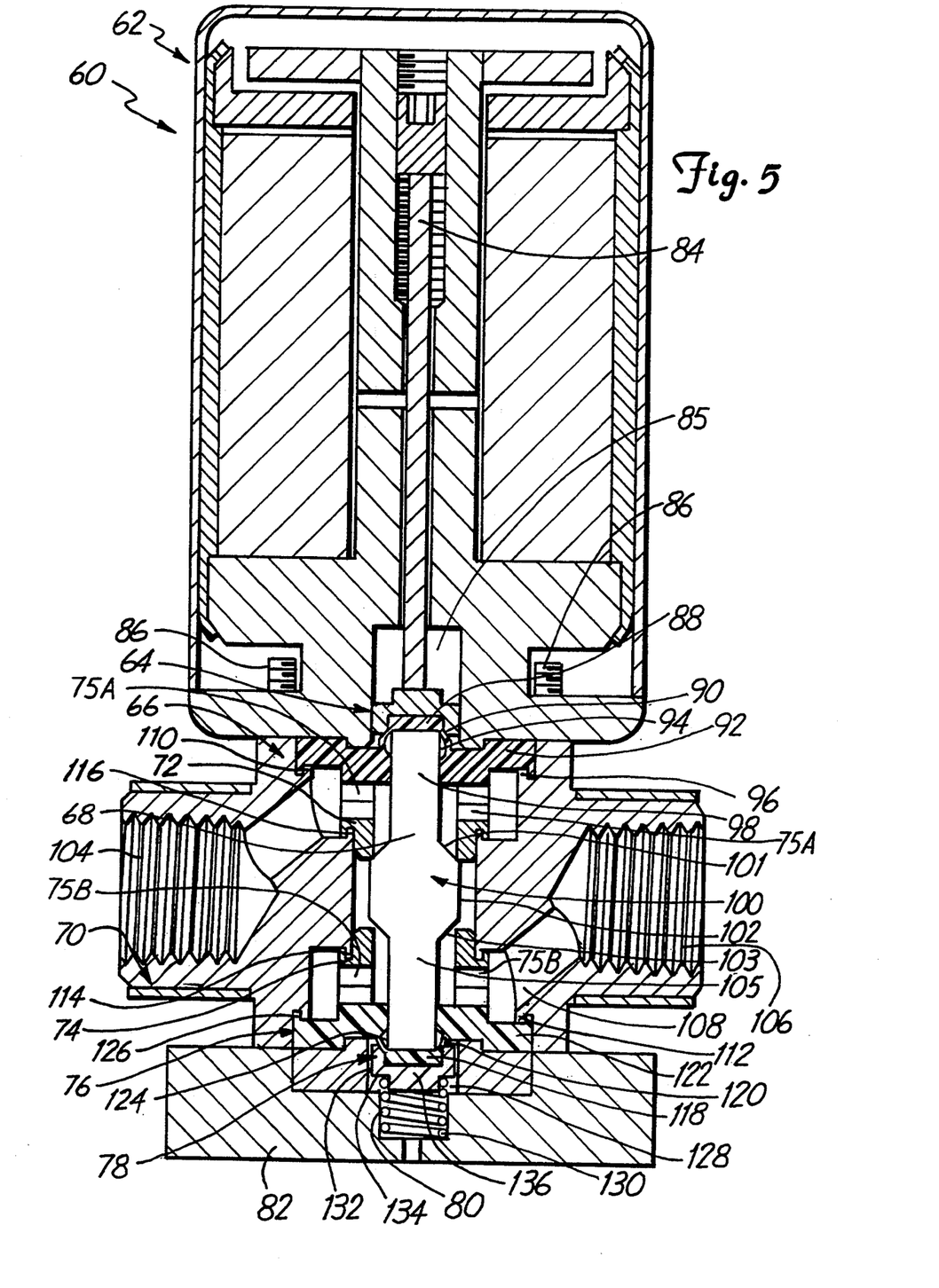
FIG. 5 is a sectional view of a solenoid or pneumatic valve containing the single convolute bellows of the present invention.

FIG. 5 shows a valve 60 which employs two of the single convolute bellows of the present invention. Valve 60 includes solenoid 62, cap 64, bellows 66, poppet 68, body 70, seats 72 and 74, bores 75A and 75B bellows 76, cap 78, spring 80, and base 82. Solenoid 62 is coupled to a top end of body 70. Bellows 66 is sealed within a top end of body 70 and is adjacent solenoid 62 and cap 64. Cap 64 is fitted with bellows 66 and slides within solenoid 62. Base 82 is mounted to a bottom end of body 70. Bellows 76 is sealed within a bottom side of body 70 and is adjacent base 82 and cap 78. Cap 78 is fitted with bellows 76 and slides within base 82. Spring 80 rests within base 82 and nests around cap 78. Poppet 68 is captured in body 76 between bellows 66 and bellows 76. Seats 72 and 74 are coupled to body 70 between bellows 66 and bellows 76. Poppet 68 and seats 72 and 74 mate to block fluid flow through valve 60.

In the embodiment shown in FIG. 5, bellows 66 and seat 72 are formed from a single body of thermoplastic such as PTFE. Similarly, bellows 76 and seat 74 are formed from a single body of thermoplastic, such as PTFE. Bore 75A extends through the body between bellows 66 and seat 72. Bore 75B extends through the body between bellows 76 and seat 74.

Valve 60 is used to regulate fluid flow. To regulate flow, solenoid 62 applies an axial force to cap 64 which, in turn, applies an axial force to bellows 66. As bellows 66 compresses, it applies an axial force to poppet 68. Poppet 68, in turn, moves and expands bellows 76. In turn, bellows 76 applies an axial force to cap 78 which compresses spring 80 in base 82. By moving poppet 68 in an axial direction within body 70, and between seats 72 and 74, fluid flow between poppet 68 and seat 72 or 74 is permitted. Consequently, fluid flow through valve 60 is regulated.

In particular, solenoid 62 is a standard solenoid including rod 84 and lower cavity 85. Lower cavity 85 projects into a bottom side of solenoid 62. Rod 84 extends through solenoid 62 and into cavity 85 where rod 84 attaches to cap 64. When solenoid 62 is actuated, rod 84 of solenoid 62 applies an axial force to cap 64 which is slidably housed within cavity 85. Bolts 86 extend through the bottom side of solenoid 62 and couple solenoid 62 to a top end of body 70.

Bellows 66 (which is sealed to a top end of body 70 and which is fitted to cap 64) includes head 88, thin-walled circumferential band or convolute 90 and shoulder 92. Blind hole 94 extends through shoulder 92 to head 88. Convolute 90 is integral with head 88 and shoulder 92 and extends between head 88 and shoulder 92. Convolute 90 is bowed outward and is capable of changing its outward bow to allow bellows 66 to change length in an axial direction. Shoulder 92 is integrally connected to one end of convolute 90 and has an outer diameter larger than an outer diameter of head 88 and convolute 90. Shoulder 92 includes tongue 96 which emanates toward base 82 around an outer perimeter of shoulder 92. Shoulder 92 is further sized and formed to mate within a top side of body 70.

Head 88 of bellows 66 fits within cap 64. Tongue 96 of shoulder 92 mates with body 70 to provide a stationary seal between bellows 66 and body 70. As rod 84 of solenoid 62 applies an axial force to cap 64, cap 64 moves within cavity 85. Cap 64 applies an axial force to head 88 of bellows 66. As axial force is applied to head 88, convolute 90 bows further outward to decrease distance between head 88 and shoulder 92. As bellows 66 is compressed, an inside surface of head 88 applies an axial force to poppet 68.

Poppet 68 (which is captured between bellows 66 and bellows 76 within body 70) includes upper neck 98, central bulb 100 and lower neck 105. Central bulb 100 is located at a midpoint of poppet 68 between upper neck 98 and lower neck 105 and includes upper slant 101, surface 102 and lower slant 103. Near a midpoint of poppet 68, an outer diameter of poppet 68 widens at an angle to form upper slant 101. The outer diameter of poppet 68 is then kept constant to form surface 102. Beyond a midpoint of poppet 68, the outer diameter of poppet 68 narrows at an angle to form lower slant 103. After narrowing, the outer diameter of poppet 68 remains constant to form lower neck 105. The outer diameter of lower neck 105 equals an outer diameter of upper neck 98. Bulb 100 has an outer diameter greater than the outer diameters of upper neck 98 and lower neck 105. Upper neck 98 of poppet 68 extends through blind hole 94 of bellows 66. A top end of upper neck 98 is in contact with an inside surface of head 88 of bellows 66.

Body 70 which is coupled between solenoid 62 and base 82 and which is sealed to seats 72 and 74 and bellows 66 and 76 includes ports 104 and 106, fluid passage 108, tongue and groove seals 110 and 112, and tongues 114 and 116. Ports 104 and 106 are internally threaded to engage external threads of NPT pipe. Ports 104 and 106 are in fluid communication with fluid passage 108. Fluid passage 108 extends through body 70, below shoulder 92 of bellows 66, between poppet 68 and seats 72 and 74, to port 106. Tongue and groove seal 110 is integral with body 70 and mates with tongue 96 of bellows 66. Mated together, seal 110 and tongue 96 provide a seal and fluid barrier. Tongues 114 and 116 mate with and support upper seat 72 and lower seat 74, respectively. Seats 72 and 74 are coupled to tongues 110 and 112 of body 70 and are positioned within fluid passage 108. Seats 72 and 74 are sized to mate with central bulb 100 of poppet 68 such that when upper seat 72 mates with upper slant 101 of central bulb 100, or when lower seat 74 mates with lower slant 103 of central bulb 100, fluid flow through passage 108 and through ports 104 and 106 is blocked.

Bellows 76 which is sealed to a bottom end of body 70 and which is fitted to cap 78 includes head 118, convolute 120 and shoulder 122. Blind hole 124 extends through shoulder 122 to head 118. Convolute 120 is bowed outward and extends integrally between head 118 and shoulder 122. Convolute 120 is capable of bowing further outward to reduce distance between head 118 and shoulder 122. Shoulder 122 is integrally connected to one end of convolute 120 and has a larger outer diameter than either head 118 or convolute 120. Shoulder 122 includes tongue 126 which emanates toward solenoid 62 around an outer perimeter of shoulder 122. Tongue 126 couples with tongue and groove seal 112 of body 70 to provide a stationary seal between bellows 76 and body 70. Hole 124 receives lower neck 105 of poppet 68. A bottom surface of lower neck 105 is in contact with an inside surface of head 118. An outside surface of head 118 fits within and is surrounded by cap 78.

Base 82 (which is mounted to a lower end of body 70 and which houses cap 78 and spring 80) includes upper cavity 128 and lower cavity 130. Upper cavity 128 has an inside diameter larger than an outside diameter of cap 78. Upper cavity 128 protrudes from a top surface of base 82 into base 82. Lower cavity 130 extends below upper cavity 128 in base 70 and has an inside diameter larger than an outside diameter of spring 80. Upper cavity 128 houses cap 78 which slides within upper cavity 128. Spring 80 is supported and is housed by lower cavity 130.

Cap 78 includes bore 132, shoulder 134, and plug 136. Bore 132 extends into a top side of cap 78. Bore 132 has an inside diameter larger than an outside diameter of head 118 of bellows 76. Near a midpoint of cap 78, an outside diameter of cap 78 narrows inward to form shoulder 134. Plug 136 extends downward below shoulder 134. Bore 132 of cap 78 receives head 118 of bellows 76. Plug 136 nests within spring 80.

Spring 80 applies an axial force to shoulder 134 of cap 78. Cap 78, in turn, applies an axial force to head 118 of bellows 76. As a result, bellows 76 compresses and head 118 applies a force to the bottom surface of lower neck 105 to uphold poppet 68. Poppet 68 is upheld such that upper slant 98 of bulb 100 normally mates with upper seat 72 to contain fluid and to block the flow of fluid past poppet 68.

However, upon actuation of the solenoid 62, rod 84 applies an axial force to head 88 of bellows 66. As bellows 66 is compressed and convolute 90 bows outward, head 88 applies an axial force to a top surface of upper neck 98 of poppet 68. A lower surface of lower neck 105 of poppet 68 in turn applies an axial force to head 118 of bellows 76. As axial force is applied to head 118, an outward bow of convolute 120 is reduced as the distance between shoulder 122 and head 118 is increased to expand bellows 76. During expansion of bellows 76, head 118 of bellows 76 applies an axial force to cap 78. Cap 78, in turn, applies an axial force to spring 80 to compress spring 80 within base 82. Thus, actuation of solenoid 62 causes poppet 68 to move in an axial direction downward within body 70. This movement of poppet 68 opens fluid passage 108 between upper seat 72 and upper slant 101 of bulb 100 to permit fluid to flow past poppet 68 and through valve 60.

Upon further movement of the poppet 68, lower slant 103 of bulb 100 blocks fluid passage 108. As the solenoid reduces axial force applied to poppet 68, spring 80 expands and forces poppet 68 upward to again open fluid passage 108. Eventually, as force from solenoid 62 is reduced, poppet 68 will again mate with upper seat 72 to block fluid passage 108.

Figure 6:
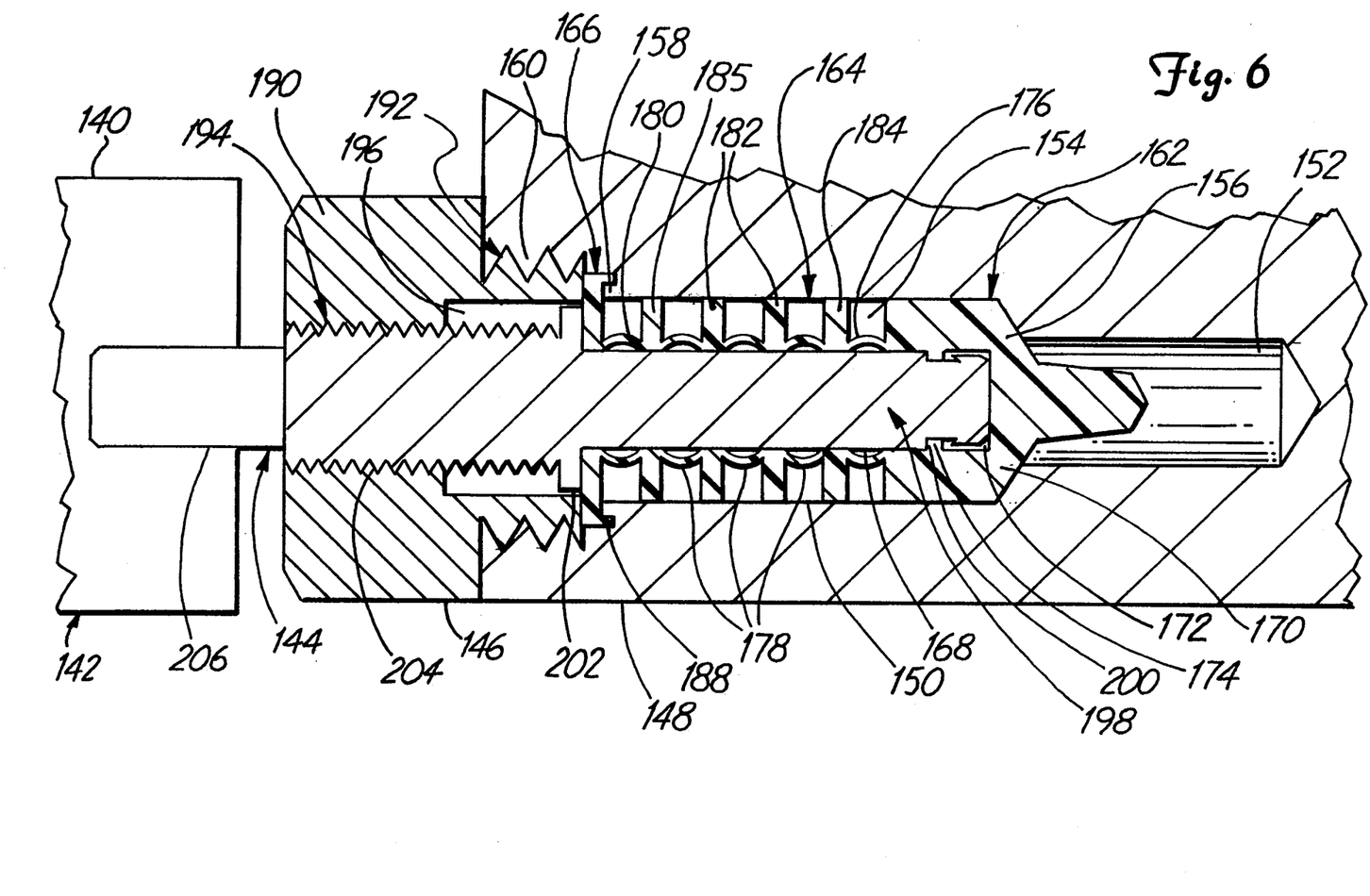
FIG. 6 is a sectional view of a valve employing the bellows of the present invention as part of a bellows stem.

FIG. 6 shows a bellows stem valve employing a multiple convolute bellows of the present invention. Bellows stem valve 140 includes knob 142, actuator shaft 144, stationary seal retainer 146, valve body 148, and bellows 150. Retainer 146 is coupled to valve body 148. Bellows 150 is sealed at one end to valve body 148 and is slidably disposed within valve body 148. Actuator shaft 144 is coupled to bellows 150 and extends within bellows 150 through retainer 146. Knob 142 is attached to actuator shaft 144 outside of valve body 148. Knob 148 applies an axial force to actuator shaft 144 which, in turn, applies an axial force to bellows 150. The expansion and compression of bellows 150 within valve body 148 regulates fluid flow through valve body 148.

In particular, valve body 148 which houses bellows 150 includes cylindrical bore 152, housing bore 154, valve seat 156, tongue and groove 158 and internal threads 160. Housing bore 154 has an inside diameter and extends into valve body 148. At a distal end of housing bore 154, the inside diameter of housing bore 154 narrows to form cylindrical bore 152. Valve seat 156 is integral with valve body 148 and is located where the inside diameter of housing bore 154 narrows. Valve seat 156 is formed to mate with bellows 150 so that fluid flow between cylindrical bore 152 and housing bore 154 may be blocked when bellows 150 is expanded. Tongue and groove 158 are formed around an outside perimeter of housing bore 154 near a proximate end of housing bore 154. The proximate end of housing bore 154 has internal threads 160 for engaging retainer 146.

Bellows 150 includes head 162, neck 164, shoulder 166 and blind hole 168. Head 162 is integrally connected to neck 164 and is located at a distal end of bellows 150. Shoulder 166 is integrally connected to neck 164 and is located at a proximal end of bellows 150. Neck 168 extends between shoulder 166 and head 162. Head 162 includes cone 170, bore 172 and capture 174. Blind hole 168 extends through an opening in shoulder 166 within neck 164 and into head 162. A proximal end of head 162 has an outer diameter smaller than the inner diameter of housing bore 154. Toward a distal end of head 162, the outer diameter narrows to form cone 170. Cone 170 is sized to mate with valve seat 156 of valve body 148 so that upon full expansion of bellows 150, fluid flow between housing bore 154 and cylindrical bore 152 is blocked. Blind hole 168 of bellows 150 extends into head 162 to form bore 172. Bore 172 has an inside diameter greater than an outside diameter of actuator shaft 144. Capture 174 is integral with head 162 and protrudes into bore 172 around an inside perimeter of bore 172. Bore 172 receives actuator shaft 144 while capture 174 couples with actuator shaft 144 to couple actuator shaft 144 to head 162 of bellows 150.

Neck 164 which integrally connects head 162 and shoulder 166 includes convolutes 176, 178 and 180, and ribs 182, 184 and 185. Convolute 176 is a thin walled circumferential band bowed outwardly which integrally extends between head 162 and rib 184 near an inner perimeter of head 162 and rib 182. Convolutes 178 are thin-walled circumferential bands which are bowed outward and which integrally extend between inner perimeters of ribs 182. Convolute 180 is a thin-walled circumferential band bowed outwardly which integrally extends between rib 185 and shoulder 166 near an inner perimeter of rib 185 and shoulder 166. Convolutes 176, 178 and 180 are capable of bowing further outward as bellows 150 is compressed and as an axial distance between shoulder 166 and head 162 is reduced. Ribs 182, 184 and 185 provide structural support for bellows 150 to prevent bellows 150 from collapsing inwardly.

Shoulder 166 which is integrally connected to neck 164 and which provides a seal between bellows 150 and retainer 146 includes tongue 188. Tongue 188 is integral with shoulder 166 and emanates away from shoulder 166 toward the distal end of bellows 150. Tongue 188 is sized to mate with tongue and groove 158 of valve body 148. When tongue 188 is mated with tongue and groove 158 of valve body 148, shoulder 166 provides a stationary seal at shoulder 166 between shoulder 166 and valve body 148. Consequently, fluid which flows within housing bore 154 and around bellows 150 is not permitted to escape. Shoulder 166 effectively isolates fluid within valve body 148 and within bellows 150 from actuator shaft 144 which extends within bellows 150 through retainer 146.

Retainer 146 includes body 190, coupler 192, actuator bore 194 and retainer cavity 196. Coupler 192 integrally extends from a forward-most surface of body 190. Coupler 192 has an outer diameter smaller than an outer diameter of body 190. Coupler 192 further includes external threads for engaging internal threads 160 of valve body 148. Retainer cavity 196 is centered within a forward-most end of coupler 192 and body 190. Retainer cavity 196 has an inner diameter smaller than an outer diameter of shoulder 166. Actuator bore 194 extends through body 190 from a rearward-most surface to the forward-most surface. Actuator bore 194 further includes internal threads for engaging external threads of actuator shaft 144. The external threads of coupler 192 engage the internal threads 160 of valve body 148 to couple retainer 146 to valve body 148. The forward-most surface of coupler 192 abuts a rearward-most surface of shoulder 166 to press shoulder 166 and tongue 188 against valve body 148 and tongue and groove 158. Thus, retainer 146 ensures that bellows 150 is completely fitted within valve body 148.

Actuator shaft 144 extends through and within retainer 146 and bellows 150 to couple with head 162 of bellows 150. Actuator shaft 144 includes piston 198, groove 200, pad 202, threaded shank 204, and rod 206. Piston 198 extends from a midpoint of actuator shaft 144 to a distal end of actuator shaft 144. Piston 198 has an outer diameter smaller than the inner diameter of blind hole 168 and smaller than the outer diameter of bore 172 of head 162 of bellows 150. Groove 200 is located near a distal end of piston 198 and extends around an outer surface of piston 198. Pad 202 is adjacent to the proximate end of piston 198. Pad 202 has an outer diameter greater than the outer diameter of piston 198. The outer diameter of pad 202 is smaller than the outer diameter of shoulder 166 and the inner diameter of retainer cavity 196. Threaded shank 204 is integral with pad 202 and extends from pad 202 toward the proximate end of actuator shaft 144. Threaded shank 204 has an outer diameter less than the inner diameter of retainer cavity 196. Threaded shank 204 further includes external threads for engaging the internal threads of body 190 of retainer 146. Rod 206 extends from a proximate end of threaded shank 204 and is coupled to knob 142.

Upon being assembled as part of valve 140, actuator shaft 144 applies axial force to bellows 150, thereby, regulating fluid flow through valve body 148. Groove 200 of actuator shaft 144 receives capture 174 of head 162, thus coupling actuator shaft 144 to bellows 150.

Piston 198 also extends through neck 164 of bellows 150 and prevents convolutes 176, 178 and 180 from collapsing inward.

Pad 202 is housed within retainer cavity 196. Because the outer diameter of pad 202 is greater than the inner diameter of blind hole 168 and greater than the inner diameter of actuator bore 194, pad 202 is contained within retainer cavity 196. Because axial movement of pad 202 is limited by depth of retainer cavity 196, pad 202 limits axial displacement of actuator shaft 144. As a result, over expansion or over compression of bellows 150 caused by axial displacement of actuator shaft 144 is prevented.

Knob 142 provides for the rotational movement of threaded shank 204 within actuator bore 194 of retainer 146. This movement causes shank 204 and, in turn, piston 198 to move in an axial direction. Because piston 198 is coupled to head 162 of bellows 150, axial movement of piston 198 causes axial movement of head 162. Thus, rotation of knob 142 causes the expansion or compression of bellows 150 within valve body 148 and permits one to adjust or regulate the flow of fluid through valve 140.

In addition to permitting axial movement of head 162 within valve body 148, bellows 150 also provides a fluid barrier to isolate fluid within housing bore 154 of valve body 148 from a source of axial force or movement, namely actuator shaft 144. Tongue 188 of shoulder 158 seals between bellows 150 and valve body 148 to prevent fluid from escaping beyond shoulder 166 of bellows 150. Neck 164 and head 162 of bellows 150 enclose piston 198 of actuator shaft 144 and prevent fluid from coming in contact with piston 198. At the same time, however, neck 164 compresses and expands to permit the regulation of fluid flow through axial movement of head 162, also known as a valve stem, to regulate fluid flow.

Although the present invention has been described with reference to preferred embodiments, workers skilled in the art will recognize that changes may be made in form and detail without departing from the spirit and scope of the invention. For example, in addition to being employed in the above described fluid control devices, the bellows of the present invention can also be used in other devices such as differential pressure gauges, bellows pumps, a bellows poppet, and a bellows piston for an actuator.

What is claimed is:

1. A method of forming a bellows, the method comprising:
   forming in a body of thermoplastic material having a head and a shoulder, an inner bore having an inner diameter;
   forming at least one thin-walled circumferential band in one circumferential surface between the head and the shoulder;
   forming an undercut into the shoulder where the shoulder meets the band, whereby the undercut reduces strain in the band when deforming the body; and
   deforming the body to cause each band to bow.

2. The method of claim 1 further comprising:
   forming an undercut into the head where the head meets the band, whereby the undercut reduces strain in the band when deforming the body.

3. The method of claim 1 wherein deforming the body further comprises fitting a cap over and around the head before deforming the body to prevent deformation of the head.

4. The method of claim 1 further comprising providing a stationary seal means at the shoulder.

5. The method of claim 4 wherein providing a stationary seal means comprises forming a tongue which emanates from the shoulder.

6. The method of claim 1 further comprising:
   forming at least one circumferential rib, each rib formed between two circumferential bands.

7. The method of claim 6 further comprising:
   forming undercuts into a first and second side of each circumferential rib where each rib meets each band, whereby the undercuts reduce strain in each band when deforming the body.

8. The method of claim 1 wherein deforming the body comprises:
   applying an axial compressive force to the body to cause bowing of each circumferential band.

9. A method of forming a bellows, the method comprising:
   forming in a body of thermoplastic material having a head and a shoulder, an inner bore having an inner diameter;
   forming at least one thin-walled circumferential band in one circumferential surface between the head and the shoulder; and
   applying fluid within the bore to cause outward bowing of each circumferential band.

10. A bellows comprising:
    a head;
    a shoulder;
    a blind hole extending from an opening in the shoulder to the head;
    a compressible neck, between the head and the shoulder, through which the blind hole extends, the neck including at least one thin-walled circumferential band located in one circumferential surface between the head and the shoulder; and
    an undercut into the shoulder where the shoulder meets the band, whereby the undercut reduces strain in the band when the neck is compressed.

11. The bellows of claim 10 further comprising:
    means associated with the shoulder for providing a stationary seal at the shoulder.

12. The bellows of claim 11 wherein the means associated with the shoulder for providing a stationary seal comprises:
    a tongue emanating from the shoulder.

13. The bellows of claim 10 wherein the head further includes:
    an undercut into the head where the head meets the band, whereby the undercut reduces strain in the band when the neck is compressed.

14. The bellows of claim 10 wherein the neck further includes:
    at least one circumferential rib, each rib located between two circumferential bands.

15. The bellows of claim 14 wherein the neck further includes:
    an undercut into a first and second side of each circumferential rib where each rib meets each band, whereby the undercuts reduce strain in each band when the neck is compressed.

16. A fluid control device comprising:
    a housing including a seat for blocking the flow of fluid through the fluid control device;
    a first integral thermoplastic bellows which includes:

a shoulder with a seal for engaging the housing;

a head which is movable in an axial direction with respect to the shoulder; and a hollow compressible neck between the head and the shoulder, the neck including at least one thin-walled circumferential band which is bowed and is capable of changing its bow to allow the neck to change length in the axial direction;

a second integral thermoplastic bellows which includes:

a shoulder with a seal for engaging the housing;

a head which is movable in an axial direction with respect to the shoulder;

a hollow, compressible neck between the head and the shoulder, the neck including a thin-walled circumferential rib which is bowed and is capable of changing its bow to allow the neck to change length in the axial direction;

a poppet captured between the first bellows and the second bellows such that when axial force is applied to the head of the first bellows, the first bellows is compressed to move the poppet to permit fluid flow between the poppet and the seat while the poppet moves the head of the second bellows to expand the second bellows; and means for applying axial force to the head to cause the head to move in the axial direction with respect to the shoulder.

17. The fluid control device of claim 16 wherein the means for applying axial force is a solenoid having a rod and a cap, the rod applying axial force to the cap which covers the head and applies axial force to the head.

18. The fluid control device of claim 16 wherein the means for applying axial force is an actuator shaft which extends through the hollow compressible neck and which is attached to the head.

19. The fluid control device of claim 16 wherein the seat mates with the head when the bellows is expanded to block fluid flow through the housing.

* * * * *